US012242351B2

(12) United States Patent
Kulkarni et al.

(10) Patent No.: US 12,242,351 B2
(45) Date of Patent: *Mar. 4, 2025

(54) SYSTEM AND METHOD FOR RESOLVING TRANSIENT AND LOCALIZED ERRORS IN A HYBRID CLOUD CACHE

(71) Applicant: Egnyte, Inc., Mountain View, CA (US)

(72) Inventors: Sanjay Kulkarni, Mountain View, CA (US); Ajay Salpekar, Mountain View, CA (US); Bhaskar Guthikonda, Mountain View, CA (US)

(73) Assignee: Egnyte, Inc., Mountain View, CA (US)

( * ) Notice: Subject to any disclaimer, the term of this patent is extended or adjusted under 35 U.S.C. 154(b) by 180 days.

This patent is subject to a terminal disclaimer.

(21) Appl. No.: 18/117,213

(22) Filed: Mar. 3, 2023

(65) Prior Publication Data

US 2023/0333934 A1 Oct. 19, 2023

Related U.S. Application Data

(63) Continuation of application No. 17/349,429, filed on Jun. 16, 2021, now Pat. No. 11,620,186.

(60) Provisional application No. 63/040,237, filed on Jun. 17, 2020.

(51) Int. Cl.
*G06F 11/00* (2006.01)
*G06F 11/14* (2006.01)
*G06F 16/16* (2019.01)
*G06F 16/182* (2019.01)
*H04L 67/568* (2022.01)

(52) U.S. Cl.
CPC ........ *G06F 11/1435* (2013.01); *G06F 16/164* (2019.01); *G06F 16/182* (2019.01); *H04L 67/568* (2022.05); *G06F 2201/82* (2013.01)

(58) Field of Classification Search
CPC .. G06F 11/1435; G06F 16/182; G06F 16/164; G06F 2201/82; H04L 67/568
See application file for complete search history.

(56) References Cited

U.S. PATENT DOCUMENTS

| 10,416,996 | B1 | 9/2019 | Samprathi et al. |
| 10,503,612 | B1 * | 12/2019 | Wang ................. G06F 11/2023 |
| 10,999,370 | B1 | 5/2021 | Schwartz |
| 11,119,990 | B1 | 9/2021 | Chhawacharia |
| 11,138,156 | B2 | 10/2021 | Byun et al. |
| 2007/0094312 | A1 * | 4/2007 | Sim-Tang ............. G06F 16/125 |
| 2017/0213174 | A1 * | 7/2017 | Deshpande .......... G06Q 10/067 |

(Continued)

*Primary Examiner* — Loan L. T. Truong
(74) *Attorney, Agent, or Firm* — Pierson Ferdinand, LLP; Jeffrey R. Ambroziak (57) ABSTRACT

A system for resolving transient and localized errors in a hybrid cloud cache. The system may include a subsystem within a hybrid cloud cache that provides a way to handle errors associated with uploading files or folders to a cloud. The subsystem may be used to recover files and folders created by a user that could not be pushed to the cloud, while also ensuring that metadata and data are not lost. The subsystem may work with the transaction processing subsystem of the hybrid cloud cache to facilitate the release of transactions associated with the files and folders that could not be pushed to the cloud. By doing so, the subsystem assists in unblocking subsequent transactions or user operations and allows the hybrid cloud cache to upload files and folders to the cloud without interruption.

20 Claims, 3 Drawing Sheets

(56) References Cited

U.S. PATENT DOCUMENTS

| | | | |
|---|---|---|---|
| 2018/0198765 A1* | 7/2018 | Maybee | G06F 11/07 |
| 2019/0129810 A1* | 5/2019 | Kushwah | G06F 11/1453 |
| 2020/0028902 A1* | 1/2020 | Rajagopalan | G06F 11/3006 |
| 2020/0136825 A1 | 4/2020 | Gupta et al. | |
| 2021/0124645 A1* | 4/2021 | Chinthekindi | G06F 11/0793 |

* cited by examiner

SYSTEM AND METHOD FOR RESOLVING TRANSIENT AND LOCALIZED ERRORS IN A HYBRID CLOUD CACHE

CROSS REFERENCE TO RELATED APPLICATION

This application is a Continuation of U.S. patent application Ser. No. 17/349,429, titled "System and Method for Resolving Transient and Localized Errors in a Hybrid Cloud Cache," filed Jun. 16, 2021, which claims the benefit of U.S. Provisional Application No. 63/040,237, titled "System And Method For Resolving Transient And Localized Errors In A Hybrid Cloud Cache," filed Jun. 17, 2020, the disclosure of which is incorporated, in its entirety herein, by this reference.

FIELD OF THE DISCLOSURE

The present application relates to cloud technologies, data storage technologies, synchronization technologies, caching technologies, data consistency and integrity technologies, error resolution technologies, and more particularly, to a system and method for resolving transient and localized errors in a hybrid cloud cache.

BACKGROUND

A hybrid cloud is a computing architecture that combines an on-premise data center with a public cloud environment. Hybrid cloud caches are local data storage elements used in conjunction with a public cloud-based data storage and serve as an important component of internet applications, as they help achieve improved throughput and increased data access speeds. Conventionally, such caches persist data and metadata regarding operations or transactions on a local file system. The integrity of data stored locally by a hybrid cloud cache may be ensured by implementing a journaling system, where a system adds records representing user requested transactions and the associated operations to a journal. Thus, the journaling system may be a data storage location where records are added to represent operations initiated by a user or by a computing system at the direction of a user, and the backing store for a journal may comprise disk blocks. Journals may also be referred to as logs and the two terms are often used interchangeably.

When using a journal, user transactions and the associated operations are typically described using as little storage space as possible. At a high level, such operations may be classified into two types or categories of operations. The first type of operation may comprise data operations, which typically involve the local cache being used to upload data or files to, or download data or files from, the cloud system or platform. The second type of operation may comprise metadata operations, which typically involve the local cache being used to perform operations where data itself is not involved. For example, such metadata operations may include, but are not limited to, data or file rename and delete operations.

For practical reasons of local storage capacity, journals cannot grow indefinitely and typically must wrap-around, where this refers to a journaling system having the ability to overwrite old records without a system losing data or metadata. The ability to overwrite or wrap-around for a journal is dependent upon the operations described by the journal records having been completed and the associated data, file, or metadata having reached a final destination (such as a cloud-based platform), and so may be removed from the local hybrid cloud cache.

From the vantage point of a hybrid cloud cache, operations performed through it (i.e., using the local cache as a data storage to record a transaction or operation) are referred to as Explicit Transactions (or write-through transactions), while operations that are performed directly in the cloud, i.e., around or without use of the cache, are referred as Implicit Transactions (or write-around transactions).

User initiated transactions often include (or result in) a mix of data and metadata operations. Data operations, which involve transfer of the actual data, typically take a longer time to complete than metadata operations. In some situations, each of the operations to be performed may be assigned monotonously increasing numbers referred to as transaction identifiers. In order to maintain consistency and ensure the integrity of the hybrid cloud cache, the transactions may be "pushed" to the cloud in the same order that they appear in the hybrid cloud cache, that is in the numerical order of the transaction identifiers. Transactions may also be marked PUSHDONE in the journal in the same order.

Errors may occur while pushing a transaction to the cloud. These errors can be broadly categorized as being transient or long lasting. Transient errors are likely to disappear and can often be corrected by retrying an operation a few times, whereas long lasting errors cannot be remedied by retrying an operation.

Longer lasting errors can further be categorized as global errors or localized errors. The scope of localized errors, such as name and type conflicts, is limited to a particular part of a cached namespace, whereas global errors, such as network connectivity issues, affect and can impact the entire namespace. Localized errors such as name and/or type conflicts may sometimes be resolved by renaming the objects involved. Global errors may sometimes be resolved by switching the hybrid cloud cache to an offline or read-only status. Despite this method of error handling, the user data and metadata typically need to be preserved, and the transaction must be concluded to unblock subsequent transactions. Normally when there are no errors, the data and metadata are preserved in both the cache and cloud. However, when there is an error which caused a folder/file to be moved to a Lost+Found region of a cache, then the data and metadata are preserved only in the cache.

While current technologies and methodologies for using hybrid cloud computing architectures provide benefits and efficiencies, such technologies and methodologies still have disadvantages. These disadvantages include the method of handling transient and longer-term errors in the operation of the hybrid cloud cache. Embodiments disclosed herein are directed to overcoming these disadvantages, both individually and collectively.

SUMMARY

The terms "invention," "the invention," "this invention," "the present invention," "the present disclosure," or "the disclosure" as used herein are intended to refer broadly to all of the subject matter described in this document, the drawings or figures, and to the claims. Statements containing these terms should be understood not to limit the subject matter described herein or to limit the meaning or scope of the claims. Embodiments covered by this disclosure are defined by the claims and not by this summary. This summary is a high-level overview of various aspects of the disclosure and introduces some of the concepts that are further described in the Detailed Description section below.

This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

As will be described, conventional methodologies and technologies used in managing a hybrid cloud computing architecture or other system that includes a hybrid cloud cache may be modified and/or enhanced by using an embodiment of the system, apparatuses, and methods described herein to provide a more optimized caching performance, along with enhanced data consistency and integrity. Such enhancements and improvements to conventional methodologies and technologies may provide improved efficiency, improved data consistency, improved data integrity, improved speed, improved upload and/or download optimization capabilities, improved caching capabilities, improved wrap-arounds, improved overwrites, reduced blocking of transactions, improved long-term and short-term performance, reduced costs, and increased ease-of-use.

A system, apparatus, and accompanying methods for resolving transient and localized errors in a hybrid cloud cache architecture are disclosed herein. In some embodiments, the system, apparatus, and methods comprise a "Lost+Found" subsystem of a hybrid cloud cache for use in handling and resolving various types of errors occurring in a cloud computing system.

In conventional filesystems, a Lost+Found file or folder may be utilized as a destination to recover files from a corrupt filesystem using a filesystem check operation (e.g., by using the fsck command or function). In conventional systems and approaches, the files recovered by using fsck may lack context and often do not have complete data, metadata, or both. In some cases, a file system error may cause the recovery tool (fsck) to be unable to determine the parent directory/folder that the file should be in, and it operates to move the file to the Lost+Found. In such cases, the only information that is known about the object is its unique inode number, and often not even the name of the file.

In the absence of a file name, parent folder or file, and other relevant metadata, the recovery process is cumbersome and unreliable. This can impact the operation of the hybrid cloud cache and the execution of other transactions. A file may also be moved to Lost+Found due to other types of errors, or an inability to determine other types of information about an object. This is why the preservation of metadata when an object is moved to a Lost+Found can be of such importance in overcoming a file system error and recreating corrupted files or folders.

In contrast, in a system or architecture comprising a hybrid cloud cache and the associated methods described herein, a subsystem (referred to as a Lost+Found) is used to recover files and folders created by the user that could not be pushed to the cloud (i.e., to a cloud-based platform) without loss of metadata and/or data. In some embodiments, the Lost+Found subsystem works together with the transaction processing subsystem of a hybrid cloud cache computing architecture to release transactions involving those files and folders that could not be pushed to the cloud due to errors. This allows for the unblocking of the subsequent transactions and/or user-initiated operations. Further, as will be described, the files and folders in the Lost+Found subsystem can be recovered with both the data and metadata intact.

In one embodiment, the disclosure is directed to a method for resolving transient and localized errors in a hybrid cloud cache. The method may include the following steps, stages, or operations:

receiving a request from a client to perform a data operation involving the upload of a file, creation of a folder, or both, to a cloud-based platform or system;

in response, the system may proceed to perform an operation that includes associating the requested data operation with a corresponding transaction in a journal of a hybrid cloud cache of the system;

in some examples, this may include creating, writing, or entering a transaction corresponding to the requested operation in the journal;

the system may also perform an operation that includes associating (or assigning) a unique identifier to the transaction;

the identifier may be a number, with the transactions in the cache being numbered in a sequential order of when they were entered into the cache;

the system may then attempt to upload or push the file, the folder, or both to the cloud (where, as explained, pushing the folder may represent creating the folder in the cloud);

if a failure occurs while attempting to push the file, the folder, or both to the cloud, then the method may include performing one or more of the following steps or operations, depending on the indicated condition;

If a folder is being pushed to the cloud and is associated with a create folder transaction, and has no parent in the metadata file system of the Lost+Found subsystem, then if a failure occurs in pushing the folder to the cloud, then the system and methods operate to move the folder to a metadata file system (MDFS) of a Lost+Found subsystem of the hybrid cloud cache, rename the folder to the unique identifier and add an entry in the meta-file of the MDFS of the Lost+Found subsystem;

if a file is being pushed to the cloud and is associated with a file upload transaction, and has no parent in the metadata file system of the Lost+Found subsystem, then if a failure occurs in pushing the file to the cloud, then the system and methods operate to move the file to a data cache file system (DCFS) of the Lost+Found subsystem of the hybrid cloud cache and add an entry in the meta-file of the MDFS of the Lost+Found subsystem;

if a parent folder of the folder that was the subject of the failed create operation is already in the metadata file system of the Lost+Found subsystem, then the system operates to flag the folder as already in the Lost+Found subsystem of the hybrid cloud cache and add an entry in the meta-file of the parent folder in the Lost+Found subsystem;

if a parent folder of the file that was the subject of the failed upload operation is already in the metadata file system of the Lost+Found subsystem, then the system operates to add an entry associated with the file in a meta-file of the parent folder and move the file from the DCFS of the cache to the DCFS of the Lost+Found subsystem; and in some embodiments, the method may write a PUSH-DONE record in the journal of the hybrid cloud cache for the currently executed transaction with an indicator of success or failure; and the method may include enabling a subsequent transaction to be processed by the hybrid cloud cache transaction processing subsystem despite the failure of the operation.

In another embodiment, the disclosure is directed to a system for resolving transient and localized errors in a hybrid cloud cache. The system may include a memory that stores a set of computer-executable instructions and a processor or processors that execute the instructions. When executed by the processor or processors, the instructions cause the processor or processors (or a device of which they are part) to perform a set of operations that implement the disclosed method.

In another embodiment, the disclosure is directed to a set of computer-executable instructions for resolving transient and localized errors in a hybrid cloud cache. The computer instructions, when executed by a processor or processors, may cause the processor or processors (or a device of which they are a part) to perform a set of operations that implement the disclosed method.

These and other features of the systems and methods for resolving transient and localized errors in a hybrid cloud cache are described in the following detailed description, drawings, and appended claims. Other objects and advantages of the systems and methods described will be apparent to one of ordinary skill in the art upon review of the detailed description and the included figures. Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the forms disclosed. Rather, the present disclosure covers all modifications, equivalents, and alternatives falling within the scope of the appended claims.

BRIEF DESCRIPTION OF THE DRAWINGS

Embodiments of the system and methods in accordance with the present disclosure will be described with reference to the drawings, in which.

Note that the same numbers are used throughout the disclosure and figures to reference like components and features.

DETAILED DESCRIPTION

The subject matter of embodiments of the present disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure will be described more fully herein with reference to the accompanying drawings, which form a part hereof, and which show, by way of illustration, exemplary embodiments by which the disclosure may be practiced. The disclosure may, however, be embodied in different forms and should not be construed as limited to the embodiments set forth herein; rather, these embodiments are provided so that this disclosure will satisfy the statutory requirements and convey the scope of the disclosure to those skilled in the art.

Among other things, the present disclosure may be embodied in whole or in part as a system, as one or more methods, or as one or more devices. Embodiments of the disclosure may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, controller, etc.) that is part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, the set of instructions may be conveyed to a user through a transfer of instructions or an application that executes a set of instructions (such as over a network, e.g., the Internet). In some embodiments, a set of instructions or an application may be utilized by an end-user through access to a SaaS platform or a service provided through such a platform.

In some embodiments, one or more of the operations, functions, processes, or methods described herein may be implemented by a specialized form of hardware, such as a programmable gate array, application specific integrated circuit (ASIC), or the like. Note that an embodiment of the inventive methods may be implemented in the form of an application, a sub-routine that is part of a larger application, a "plug-in", an extension to the functionality of a data processing system or platform, or other suitable form. The following detailed description is, therefore, not to be taken in a limiting sense.

As mentioned, in conventional systems that implement a hybrid cloud cache, an object (e.g., a file) may be moved to a Lost+Found because the file system is corrupt and the recovery tool (fsck) is not able to determine the parent directory/folder of the file. This makes the recovery process more difficult and prone to error. However, this problem can be overcome if the metadata associated with a file can be preserved when a file is transferred to the Lost+Found.

As will be described further, the disclosed system, apparatuses, and methods implement a Lost+Found subsystem for handling files and folders that cannot be pushed to the cloud (i.e., a cloud-based data storage and data processing platform that is part of a hybrid cloud cache system) due to errors in pushing the upload file or create folder operations. In some embodiments, the disclosed system, apparatuses, and methods utilize a Lost+Found as a subsystem of a hybrid cloud cache, where the Lost+Found file or folder has a structure similar to (and compatible with) that of the namespace(s) cached by the hybrid cloud cache.

In some embodiments, the Lost+Found subsystem may have its own metadata file system (MDFS), data cache file system (DCFS), and associated meta-files. The Lost+Found subsystem may be utilized to assist in processing and resolving a transaction that results in a failed push operation, without permitting the failure to prevent the processing of other transactions. In some embodiments, this is accomplished by using the described logic to resolve the failure while ensuring the integrity of the hybrid cache journal and by releasing the transaction processing and computing resources associated with the transaction within a finite time. This allows those resources to be used by the processing subsystem of the hybrid cloud cache for processing other transactions.

Preserving data, metadata, and the effects of user operations by redirecting the data and metadata to a Lost+Found subsystem of the local cache of a hybrid cloud cache system can provide multiple benefits. For example, since the data and metadata are preserved via the Lost+Found subsystem, the transactional integrity of the hybrid cloud cache is maintained. Additionally, by releasing transactions that involve operations associated with files and folders that cannot be pushed to the cloud, the system and methods allow for using journal/log wraparound for the remaining transactions without a decrease in the throughput of the hybrid cloud cache. Furthermore, the system, apparatus, and methods disclosed allow users to recover data and contextual information associated with the data after resolving an underlying problem preventing an upload of a file or creation of a folder, and can also be enhanced to execute operations orthogonal to (i.e., independent of) the hybrid cloud cache.

In some embodiments, one orthogonal operation that is possible to implement is to present a listing of such objects to the user/administrator and allow them to retry pushing these objects to the cloud. This operation is termed as "recovering" an object from the Lost+Found. The listing can provide additional information to the user/administrator, such as the user that performed the operation(s), the time of attempting to perform the operation(s), the size of a file, the name of the file or folder, the identifier, etc.

In some embodiments, a system that implements the disclosed method for resolving transient and localized errors in a hybrid cloud cache may receive a request from a client device or process to perform a data operation that is associated with uploading a file, creating a folder, or both, to a cloud location (such as a file or folder contained in a data storage of a cloud-based platform). In response, the system may perform an operation that includes associating the requested data operation with a corresponding transaction (or creating such a transaction) in a journal of a hybrid cloud cache of the system. The system may also perform an operation that includes associating a unique identifier with the transaction. The identifier may be a number, with the transactions in the cache being numbered in order of when they were entered into the cache (i.e., the lower numbers correspond to transactions that were entered into the cache earlier). The system may then attempt to upload or "push" the file, the created folder, or both to the cloud.

Assume that a folder is being pushed to the cloud and is associated with a create folder transaction, and that it has no parent in the metadata file system of the Lost+Found subsystem. If a failure occurs while attempting to push the folder to the cloud, then the system may perform an operation that includes moving the folder to the metadata file system (referred to as MDFS herein) of the Lost+Found subsystem of the hybrid cloud cache. This may be followed by renaming the folder to its unique identifier and adding a corresponding entry to a meta-file of the MDFS of the Lost+Found subsystem.

Now assume that a file is being pushed to the cloud and is associated with an upload file transaction, and that it has no parent in the metadata file system of the Lost+Found subsystem. If a failure occurs while attempting to push the file to the cloud, then the system may perform an operation that includes moving the file to a data cache file system (referred to as DCFS herein) of the Lost+Found subsystem of the hybrid cloud cache and adding an entry in the meta-file of the MDFS of the Lost+Found subsystem.

If a parent folder of a folder that was the subject of the failed create operation is already in the metadata file system of the Lost+Found subsystem, then the hybrid cloud cache system may perform an operation that includes flagging or indicating the folder as already in the Lost+Found subsystem of the hybrid cloud cache and adding an entry in the meta-file of the parent folder in the Lost+Found subsystem.

If a parent folder of a file that was the subject of the failed push operation is already in the metadata file system of the Lost+Found subsystem, then the system may perform an operation that includes adding an entry associated with the file in a meta-file of the parent folder and moving the file from the DCFS of the cache to the DCFS of the Lost+Found subsystem.

Further, in some embodiments, the system may perform an operation that includes writing a PUSHDONE record (or other indication of a completed transaction) in the journal of the hybrid cloud cache for the current (i.e., the failed or uncompleted) transaction. Moreover, the system may perform an operation that includes enabling a subsequent transaction to be processed by the hybrid cloud cache despite the failure in the upload or create operation.

Figure 1:
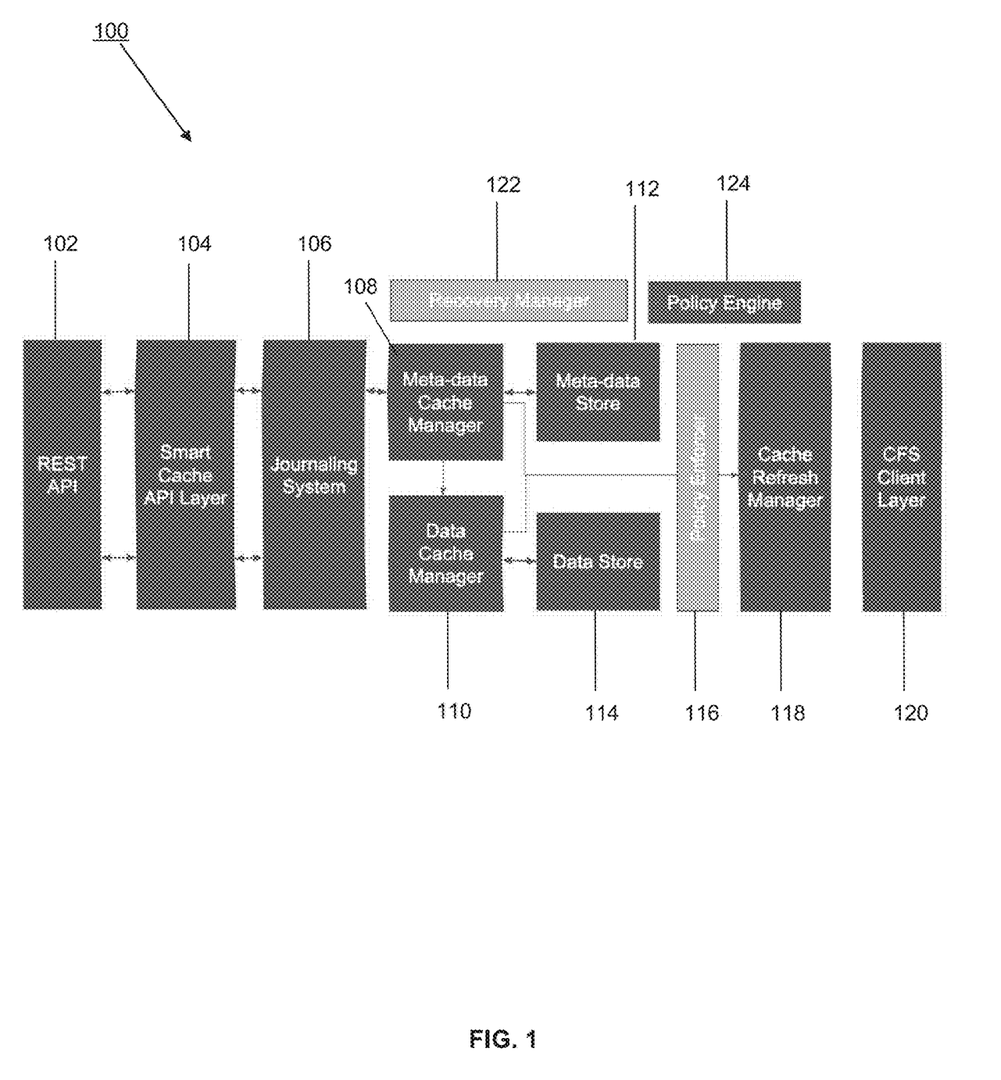
FIG. 1 is a schematic diagram illustrating a system including components for supporting functionality for resolving transient and localized errors in a hybrid cloud cache, in accordance with some embodiments.

FIG. 1 is a schematic diagram illustrating a system 100 including components for supporting functionality for resolving transient and localized errors in a hybrid cloud cache, in accordance with some embodiments. In particular, the system 100 and methods provide for implementing a "Lost+Found" directory (e.g., Lost+Found subsystem 206 of FIG. 2) portion of a hybrid cloud cache for handling errors occurring in a hybrid cloud computing system. As mentioned, in a conventional filesystem, a Lost+Found data storage may be used as a destination to recover files from a corrupt filesystem by using a filesystem check (e.g., using the fsck operation or command). However, the files recovered by using fsck in a conventional system may be without context and often do not include complete data, metadata, or both.

In contrast, a hybrid cloud cache system or architecture as disclosed herein utilizes a Lost+Found as an element or component to recover files and folders that could not be pushed to the cloud and does so without losing metadata and/or data. In some embodiments, the Lost+Found subsystem in a hybrid cloud cache may be used in coordination with the transaction processing (sub)system of a hybrid cloud cache to release transactions associated with those files and folders that could not be pushed to the cloud (i.e., to a location or destination on a cloud-based platform or system) due to errors. This allows for the unblocking of the subsequent transactions and/or user requested operations. Further, the files and folders in the Lost+Found may be recovered while ensuring that the data and metadata remain intact.

As described herein, the system 100 and methods implement a Lost+Found subsystem for handling files and folders that cannot be pushed to the cloud, such as where a transaction meant to push a folder or file to the cloud cannot be completed. To that end, the system 100 and methods utilize the Lost+Found as a subsystem of the hybrid cloud cache, where the Lost+Found structure is similar to that of the namespace cached by the hybrid cloud cache.

Figure 2:
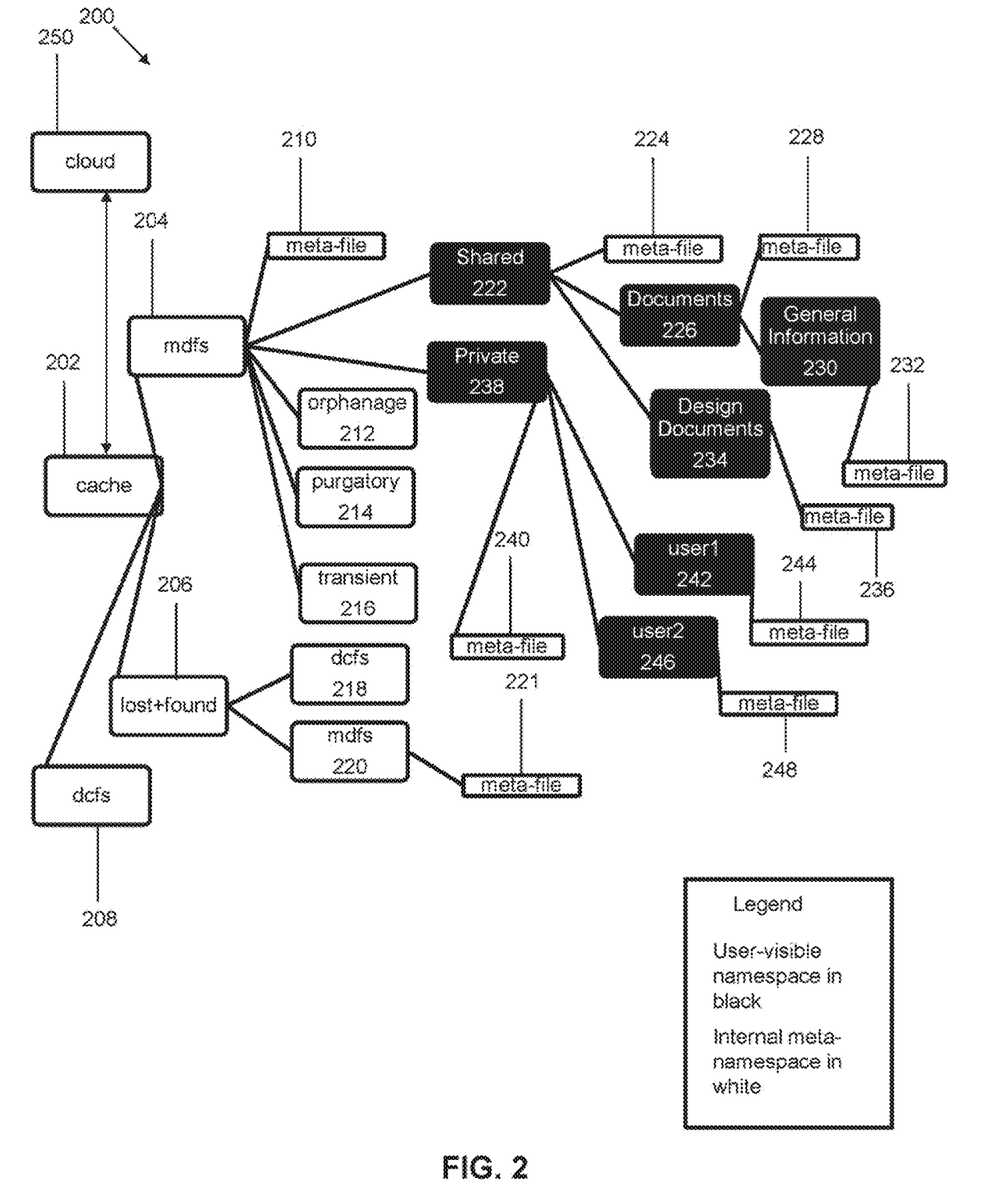
FIG. 2 is a schematic diagram illustrating a system including additional components for supporting the functionality of the system of FIG. 1, in accordance with some embodiments.

In some embodiments, the Lost+Found subsystem 206 (as shown in FIG. 2) may have its own associated MDFS (metadata file system) 220, DCFS (data cache file system) 218, and meta-files (e.g., meta-file 221). The Lost+Found subsystem 206 may assist in releasing a transaction that cannot be completed due to a failure to push a folder or file to the cloud by releasing the transaction and the computing resources associated with the transaction in a time-bounded manner.

As mentioned, preserving data, metadata, and the effects of user operations by redirecting them to the Lost+Found subsystem 206 on the local storage of a hybrid cloud cache provides several benefits. Since the data and metadata are preserved via the Lost+Found subsystem 206, the transactional integrity of the hybrid cloud cache may be maintained. Additionally, by releasing transactions corresponding to failed operations to push a file or folder to the cloud, the system 100 and methods allow for journal/log wraparound for subsequent transactions without a decrease in the throughput of the hybrid cloud cache. Furthermore, the system 100 and methods allow users to recover data and context information associated with the data after resolving the underlying problem(s) that prevented a creation of the folder or upload of the file.

In some embodiments, the Lost+Found subsystem can be enhanced to include the capability to execute operations orthogonal to (i.e., independent of) the hybrid cloud cache. For example, the processes or operations compatible with the Lost+Found subsystem can be extended to support actions specific to the Lost+Found, such as providing users or administrators with functionality to recover a file by pushing it to the cloud, restoring it to the cache, or deleting a file without interfering with the regular operations of the Hybrid Cloud Cache.

In some embodiments, the hybrid cloud cache may keep folders in the MDFS(s) (metadata file system, as described with reference to FIG. 2) and files in the DCFS(s) (data cache file system, as described with reference to FIG. 2). The MDFS may be a structured hierarchy or tree of cached folders and the DCFS may be a repository of cached files stored as objects. At each level of a MDFS, the cache may maintain a meta-file that contains metadata for folders and files created by the user (or system) at that level. In some embodiments, folder listing operations (such as a refresh operation) may read the meta-file instead of traversing the tree itself. Additionally, the Lost+Found subsystem may have its own MDFS, DCFS, and meta-files. As described, files and/or folders that could not be successfully pushed to the cloud from the hybrid cloud cache may be moved to the Lost+Found subsystem.

For each folder or file, a transaction may have been created as part of processing a user's request to create the folder/file, and the folder/file may be created locally in the hybrid cloud cache and associated with a unique identifier (such as a UID). The folder and/or file may be pushed to the cloud, and then the transaction may be released by a transaction processing (sub)system of the hybrid cloud cache by writing a PUSHDONE record for the appropriate transaction in the journal of the hybrid cloud cache.

However, if there is a failure while attempting to push the folder and/or file to the cloud, then instead of stopping the processing, the disclosed system, apparatus, and methods may proceed in one of the following ways to address and overcome the failure:

If a folder is being pushed to the cloud and is associated with a create folder transaction, and the folder has no parent folder in the MDFS of the Lost+Found subsystem, then if a failure occurs in pushing the folder to the cloud (i.e., in creating the folder in the cloud), the system, apparatus, and methods may operate to move the folder to the MDFS of the Lost+Found subsystem in the hybrid cloud cache and rename the folder to its unique identifier to avoid naming clashes (conflicts);

The system may "flag" the folder as being in the Lost+Found in memory and may add an entry in the meta-file of the MDFS of the Lost+Found subsystem indicating the flagging and/or the push operation failure information;

If a file is being pushed to the cloud and is associated with an upload file transaction, and the file has no parent in the MDFS of the Lost+Found subsystem, then if a failure occurs in pushing the file to the cloud, the system, apparatus, and methods may move the file to the DCFS of the Lost+Found subsystem and may add an entry in the meta-file of the MDFS of the Lost+Found subsystem indicating the failure and the movement of the file to the DCFS;

If the parent folder of a folder that was the subject of a push (create operation) failure is already in the Lost+Found subsystem MDFS, then the folder has already been moved to the Lost+Found subsystem when the parent folder was moved;

In this situation, the system may flag the folder to be in the Lost+Found subsystem and may add an entry in the meta-file of the parent; and If the parent folder of a file that was the subject of a failed push (upload operation) is already in the Lost+Found subsystem MDFS, then the system may add an entry of the file in the parent folder's meta-file and move the file from the DCFS of the cache to the DCFS of the Lost+Found subsystem.

Returning to FIG. 1, a system 100 for resolving transient and localized errors in a hybrid cloud cache is disclosed. The system 100 may be configured to support, but is not limited to supporting, caching services, hybrid cloud services, cloud services, transaction system services, error handling services, content delivery services, monitoring services, cloud computing services, satellite services, telephone services, voice-over-internet protocol services (VoIP), software as a service (SaaS) applications, platform as a service (PaaS) applications, gaming applications and services, social media applications and services, operations management applications and services, productivity applications and services, mobile applications and services, and other computing applications and services.

In some embodiments, the system 100 may be included within another system, may be a separate system from another system, and/or may be a subsystem of another system. The system 100 may include, but is not limited to including, a REST Application Programming Interface (API) 102 (or other API), a smart cache API layer 104 (or other API layer), a journaling system 106 (which may include a number of journals), a metadata cache manager 108, a data cache manager 110, a metadata store 112, a data store 114, a policy enforcer 116, a cache refresh manager 118, a cloud-file-storage client layer 120, a recovery manager 122, and a policy engine 124.

The system 100 of FIG. 1 may represent elements or components of a hybrid cloud cache, and such a cache may utilize the various components as part of communicating with and uploading data to and/or downloading data from a cloud system or platform. The REST API 102 may serve as the interface between user devices and/or other devices and applications supporting the functionality of the system 100. The REST API 102 may be configured to receive API calls from clients (e.g., to access a cache and/or to perform other functions), such as from user devices. The smart cache API layer 104 may serve as an intermediary between the REST API 102 and the journaling system 106 and the other components of the system 100, such as, but not limited to, the cloud-file-storage system and/or other components or applications of the system 100.

The journaling system 106 may include one or more journals. One or more of the journals may be configured to record transactions associated with operations requested by a user (including, for example, data and metadata associated with the operations). The metadata may be information that describes the data and/or operations, what is in the data, and/or the type of operation. In some embodiments, the journals may be a circular log, buffer, and/or other data structure. In some embodiments, the journals may transfer records containing information associated with the operations to the cloud, such as to a cloud-based platform or system. Once the records are transferred to the cloud, the records may be deleted from (or overwritten in) the journal(s). The journal(s) may be utilized to ensure that the operations requested by users/clients are carried out and performed, even if the system 100 crashes or suffers another type of interruption. Data and metadata associated with the operations may be managed by the data cache manager 110 and the metadata cache manager 108, respectively. In some embodiments, the records including the data and metadata may be stored in the data store 114 and the metadata store 112, respectively.

The system 100 may include a policy enforcer 116, which may be configured to enforce the policies and rules associated with the system 100. The cache refresh manager 118 may be configured to refresh a cache in the system 100. For example, the cache refresh manager 118 may be configured to ensure that data and/or metadata recently stored in a particular cache is current and/or accurate. The system 100 may also include a cloud-file-storage (CFS) system client layer 120, which may be utilized to facilitate providing records associated with the operations from the journal(s) to the cloud-based file-storage system. Additionally, the system 100 may include a recovery manager 122, which may be configured to recover un-pushed data and/or metadata and to ensure that the integrity of the data in the journals and/or caches of the system 100 is preserved. The system 100 may further include a policy engine 124, which may be configured to generate and/or conduct various operations associated with policies and/or rules to be utilized with the system 100.

With regards to policy engine 124, examples of policies that may be implemented by the engine include but are not limited to, or required to include the following:
  a) Storage Management policies (e.g., how much disk space should be used by the cache);
  b) Caching policies—what should be cached, what part of cache should be updated and when; and
  c) Eviction policies—What should be evicted/removed from cache if there is a need to do so.

In some embodiments, one or more policies may be implemented in whole or in part by a rule-base, a trained machine learning model, or other decision process.

Referring now to FIG. 2, which is a schematic diagram illustrating a system including additional components for supporting the functionality of the system of FIG. 1, and in particular, an example of an architectural metadata cache system 200 that may be used with the system 100. The example shown in FIG. 2 is not intended to be limited to the specific layout, architecture, or design as shown and other desired folder-hierarchies with other number of levels may be utilized.

The system 200 may include a cache 202 for storing data, files and/or folders, a DCFS (data cache file system) 208 of the cache 202 for storing files and/or data, a MDFS (metadata file system) 204 of the cache 202 for storing metadata (for all objects in the cache, except those in the Lost+Found), a meta-file 210 of the MDFS 204 for storing metadata associated with files and/or data, an orphanage 212 for providing a separate internal meta-namespace for objects that are associated with Implicit metadata transactions, a purgatory 214 for providing a location to which are transferred objects deleted from the cloud, a transient area 216 for data for files not yet transferred to the cloud, a Lost+Found subsystem 206, a DCFS 218 of the Lost+Found subsystem 206, a MDFS 220 of the Lost+Found subsystem 206 (for metadata for the objects in the Lost+Found), a meta-file 221 of the Lost+Found subsystem 206, a shared portion 222, a meta-file 224 of the shared portion 222, documents 226 of the shared portion 222, a meta-file 228 of the documents 226, general information 230, a meta-file 232 of the general information 230, design documents 234, a meta-file 236 of the design documents 234, a private portion 238, a meta-file 240 of the private portion 238, a user1 242, a meta-file 244 associated with the user1 242, a user2 246, a meta-file 248 associated with the user2 246, and a cloud 250 (i.e., a cloud-based platform or data storage).

Folders 222, 226, 230, 234, 238, 242, and 246 are examples of user folders in the namespace. There can be any number of such folders arranged in a hierarchy. The figure shows them as examples to demonstrate that for each user folder a meta-file is created in the hybrid cloud cache which stores the metadata associated with that folder.

It should be noted that the elements, components, or processes illustrated in FIG. 2 as being in the shared portion 222 and in the private portion 238 are designated as such for purposes of an example, and are not intended to be limited to the specific files, documents, and/or other components associated with each shown in FIG. 2. In other examples, the shared portion 222 and/or the private portion 238 may have any number of user-desired folder-hierarchies inside the shared portion 222 and/or the private portion 238.

User1 242 and User2 246 may be humans, computing devices, programs, processes, clients, robots, and/or other types of users. The meta-files 210, 221, 224, 228, 232, 236, 240, 244, and 248 may serve as files that describe data, files and/or folders associated with the corresponding component of the system 200 to which they are connected. In some embodiments, the meta-files 210, 221, 224, 228, 232, 236, 240, 244, and 248 may include attributes, such as, but not limited to, name, size, user, number of versions, upload-time, another attribute, or a combination thereof.

In some embodiments, the white boxes to the left of the black boxes in FIG. 2 may form a part of an internal meta-namespace of the local hybrid cloud cache of the system 100 that is not visible to users/clients. In some embodiments, the black boxes in FIG. 2 may form a part of a user-visible namespace that is visible to users/clients. The Lost+Found subsystem 206 described herein may reside within the internal meta-namespace, which may not be configured to be visible to the users (242 and 246) that may have requested files, folders, and/or data to be uploaded or pushed to the cloud.

In some embodiments, the system 100 and system 200 may operate in the following manner with the following parameters. The hybrid cloud cache may be configured to keep folders in metadata file systems and files in the data cache file systems. In some embodiments, an MDFS may be a structured hierarchy or tree of cached folders and the DCFS may be a repository of cached files stored as objects.

At each level in the MDFS, the hybrid cloud cache maintains a meta-file (i.e., a metadata file) that contains metadata of folders and files created by the user at that level. In some embodiments, folder listing operations (such as refreshes) may read the meta-file instead of traversing the tree. The Lost+Found subsystem 206 of the hybrid cloud cache may have its own MDFS 220, DCFS 218, and meta-files 221. Any files and/or folders that could not be pushed to the cloud may be moved to the Lost+Found subsystem 206.

In order to push newly created folders and files to the cloud, the system 100 and/or 200 may perform three primary steps for every folder created and/or file uploaded by the user:
(1) The system 100, 200 may create a transaction and create the folder/file locally in the journal of the hybrid cloud cache and associate it with a unique transaction identifier (UID);
(2) The system 100, 200 may attempt to push the object (e.g., files and/or folders) to the cloud (such as by uploading a file to the cloud or creating a folder in the cloud);
(3) The system 100, 200 may release the transaction from a transaction processing subsystem of the hybrid cloud cache by writing a PUSHDONE record in the journal of the hybrid cloud cache if the object is able to be pushed to the cloud.

However, instead of stopping the operation of the hybrid cloud cache if there is a failure during a push/create attempt (2), the system 100, 200 may handle the failure in one of the following ways:
1. If a folder is being pushed to the cloud (such as may be associated with a create folder transaction) and has no parent in the MDFS of the Lost+Found subsystem, then If a failure occurs in pushing the folder to the cloud, the system 100, 200 may move the folder to the Lost+Found subsystem 206 MDFS 220 in the hybrid cloud cache and may rename the folder to its corresponding UID to avoid naming clashes. The system 100, 200 may flag this folder to be in the Lost+Found subsystem 206 in memory and may add an entry in the meta-file 221 of MDFS 220 of the Lost+Found subsystem 206;
2. If a file is being pushed to the cloud (such as may be associated with an upload file transaction) and has no parent in the MDFS of the Lost+Found subsystem, then if a failure occurs in pushing the file to the cloud, the system 100, 200 may move the file to DCFS 218 of the Lost+Found subsystem 206 and may add an entry in the meta-file 221 of MDFS 220 of the Lost+Found subsystem 206;
3. If the parent folder of a folder that was the subject of a failed push (create) operation is already in the Lost+Found subsystem 206 MDFS 220, then the folder has already been moved to Lost+Found subsystem 206 when the parent folder was previously moved. In this scenario, the system 100, 200 may just flag the folder to be in Lost+Found subsystem 206 and may add an entry in the meta-file of the parent folder; or
4. If the system 100, 200 determine that the parent folder of the file that was the subject of the failed push operation is already in Lost+Found subsystem 206 MDFS 220, then the system 100, 200 may add an entry of the file in the parent folder's meta-file and move the file to the DCFS of the Lost+Found subsystem from the DCFS of the hybrid cloud cache.

When releasing a transaction by writing a PUSHDONE record to the cache journal, the system 100, 200 may also log information about the file or folder that was moved to Lost+Found subsystem 206 to protect against crashes and to persist the information in the case of reboots. Once a PUSHDONE record has been written, the transaction processing subsystem of the hybrid cloud cache may move on to the next transaction after releasing the resources associated with the current (failed or uncompleted) transaction.

In some embodiments, use of the meta-file, MDFS 220, and DCFS 218 in the Lost+Found subsystem 206 with the transaction processing subsystem of the hybrid cloud cache causes the Lost+Found subsystem 206 to be a structure similar to that of a namespace cached by the hybrid cloud cache. It can be listed like other folders in the cache, which may enable the user to recover the files and folders from the Lost+Found subsystem 206 and back those up to cloud data storage from the hybrid cloud cache. Further, as mentioned, in some embodiments, the Lost+Found subsystem 206 can be extended to support operations or processes specific to the Lost+Found subsystem 206, such as by providing users or administrators with the capability to recover a file by pushing it to the cloud, restoring it to the cache, or deleting it without blocking or interfering with the regular operations of the hybrid cloud cache.

Figure 3:
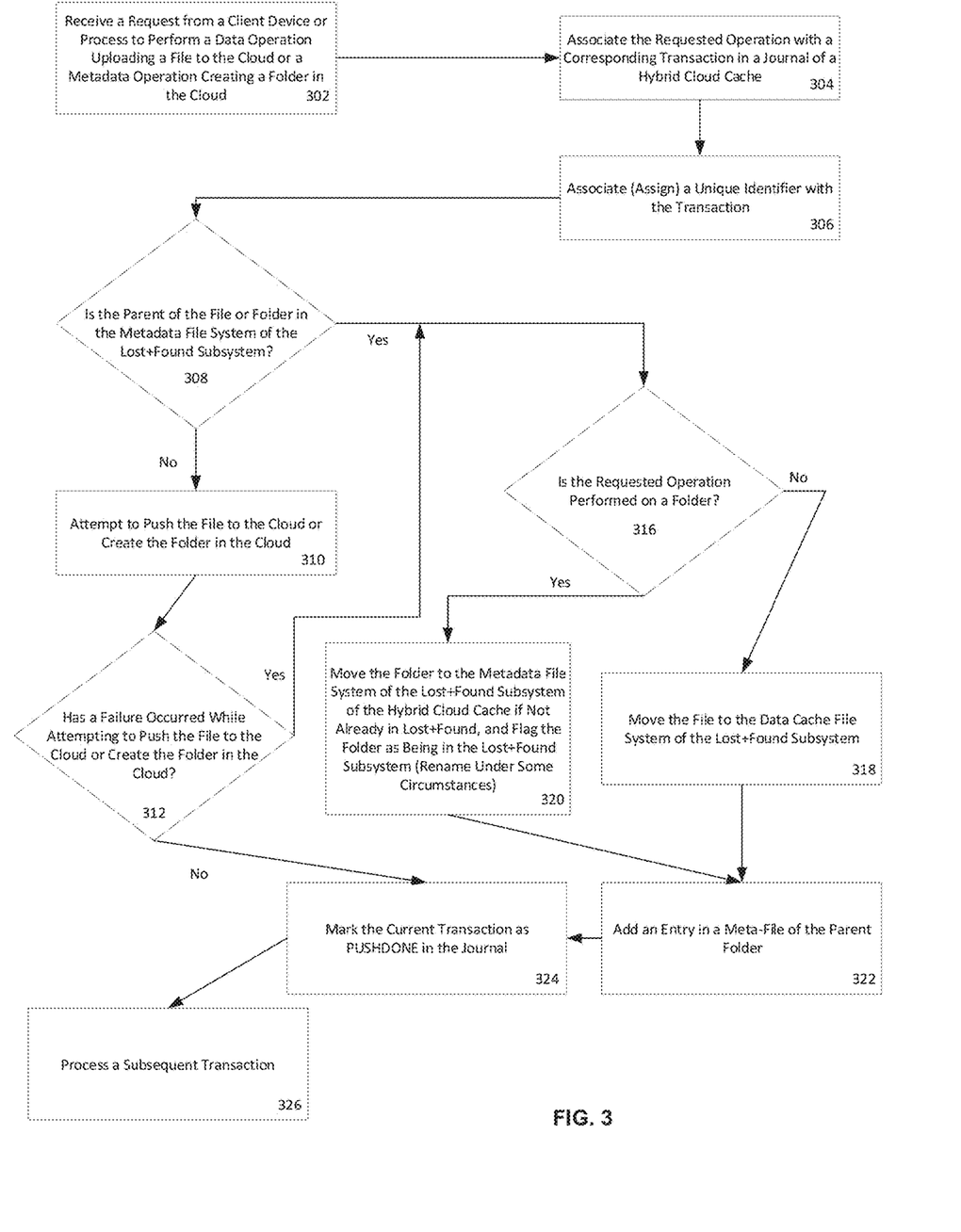
FIG. 3 is a flow diagram illustrating a sample method for resolving transient and localized errors in a hybrid cloud cache, in accordance with some embodiments.

Note that a combination of the components, devices, programs, and/or networks of the system 100 and system 200 may execute and/or conduct the functionality as described in the method(s) that follow. FIG. 3 is a flow diagram illustrating an example method for resolving transient and localized errors in a hybrid cloud cache, in accordance with some embodiments. The steps of the method 300 may be performed in any desired order unless specifically restricted to the sequence shown in FIG. 3. Additionally, unless otherwise noted, certain steps of the method 300 may be optional.

In some embodiments, the method 300 may proceed as follows:
at step 302, the method 300 may include receiving a request from a client device or process to perform a data operation involving uploading a file to the cloud or a metadata operation involving creating a folder in the cloud;
in some embodiments, at step 304 the method 300 may also include associating each requested data or metadata operation with a corresponding transaction in a journal of a hybrid cloud cache;
in some examples, this may include creating, writing, or entering a transaction corresponding to the requested data operation into a journal of the hybrid cloud cache;
at step 306, the method 300 may include assigning a transaction identifier to each transaction;
in some embodiments, the transaction identifier may be a number or other type of identifier;

the number (or other identifier) assigned by the system 100 may be in an ordered sequence and correspond to the order in which the transaction entered the journal of the hybrid cloud cache. For example, transaction identifier number 1 may be utilized with the first transaction that entered the system, transaction identifier number 2 may be utilized with the second transaction that entered the system, and so forth. Thus, in some embodiments, the number assigned to each transaction may increase in value based on the order in which each transaction entered the hybrid cloud cache of the system 100;

at step 308, the method 300 may include determining if a parent folder of the file or folder is in the MDFS of the Lost+Found subsystem 206;

if not (corresponding to the "No" branch of 308), then the method 300 may proceed to step 310, which may include attempting to push (upload) the file to the cloud or create the folder in the cloud;

at step 312, the method 300 may include determining if a failure occurred while attempting to the push/upload the file or create the folder;

if a failure has not occurred (corresponding to the "No" branch of 312), then the method 300 may proceed to step 324, which may include marking the current transaction associated with the file or folder as PUSHDONE in the journal of the hybrid cloud cache and then proceeding to step 326, which may involve processing a subsequent transaction (i.e., the next one in the ordered sequence);

if a failure has occurred (corresponding to the "Yes" branch of 312), then the method 300 may proceed to step 316, which is discussed in further detail below;

if, at step 308, it is determined that the parent folder of the file or folder is in the MDFS of the Lost+Found subsystem 206 (corresponding to the "Yes" branch of 308), then the method may proceed to step 316, which may include determining if the requested data operation is to be performed on a folder (as noted, the logic will also proceed to this step or stage if a failure occurs while attempting to execute the requested operation, as suggested by the "Yes" branch of 312);

if not (corresponding to the "No" branch of 316, where the requested operation is not one involving a folder, but instead involves a file), then the method 300 may proceed to step 318, which may include moving the file involved in the requested data operation from a DCFS of the hybrid cloud cache to a DCFS of the Lost+Found subsystem 206;

the method 300 may then proceed to step 322, which may include adding an entry providing information associated with the moved file in a meta-file of the parent folder;

the method 300 may then proceed to step 324, which may include marking the current transaction associated with the file or folder as PUSHDONE in the journal of the hybrid cloud cache, and then proceed to step 326, which may include processing a subsequent transaction using the transaction processing subsystem of the hybrid cloud cache;

if, however, at step 316, it is determined that the requested operation is to be performed on a folder (corresponding to the "Yes" branch of 316), then the method may proceed to step 320, which may include moving the folder to the MDFS of the Lost+Found subsystem 206 of the hybrid cloud cache;

additionally, at step 320, the folder may be flagged as being in the Lost+Found subsystem 206;

furthermore, at step 320, the folder may be renamed with the unique identifier if the parent folder is not in the MDFS of the Lost+Found subsystem 206;

the method 300 may then proceed to step 322 (as noted, this may occur from either step 320 or step 318), which may include adding an entry to a meta-file of the parent folder of the folder. In some embodiments, steps 316 and 322 may be combined in a single step, however, in other embodiments, the steps may be separated;

the method 300 may then proceed to step 324, which may include marking the current transaction associated with the file or folder as PUSHDONE in the journal of the hybrid cloud cache and then proceed to step 326, which may include processing a subsequent transaction using the transaction processing subsystem of the hybrid cloud cache.

One or more steps or stages of the method 300 may be incorporated in (or executed by) an element of the system 100, the system 200, or a combination as disclosed or as otherwise described herein. Further, method 300 may incorporate a function or operation described with regards to system 100 or system 200.

As mentioned, systems and apparatuses that implement the techniques and methods described may provide several benefits. In some embodiments, these benefits may include:

Making a Lost+Found subsystem with a structure similar to that of a namespace cached by a hybrid cloud cache and having its own MDFS, DCFS and meta-files;

Preserving data, metadata, and effects of the user operations by redirecting them to a Lost+Found on a local storage of a hybrid cloud cache helps in releasing the transaction and the resources associated with it for use in processing other transactions. By writing the PUSHDONE entry in sequential order and since the data and metadata are preserved, transactional integrity of the hybrid cloud cache is maintained;

Releasing the transaction associated with the operation allows log/journal wraparound without a decrease or interruption in the hybrid cloud cache's throughput; and The described embodiments allow users to recover the data and context information associated with the data after resolving the underlying problem that caused a failure in a data operation and can be enhanced to have operations orthogonal to the hybrid cloud cache.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover all adaptations or variations of various embodiments and arrangements of the system and methods described. Combinations of the above arrangements, and other arrangements not specifically described herein, will be apparent to those of skill in the art upon reviewing the above description. Therefore, it is intended that the disclosure not be limited to the particular arrangement(s) or embodiments disclosed, but include all embodiments and arrangements falling within the scope of the appended claims.

The foregoing is provided for purposes of illustrating, explaining, and describing one or more embodiments of the disclosure. Modifications and adaptations to these embodiments will be apparent to those skilled in the art and may be made without departing from the scope or spirit of this invention. Upon reviewing the embodiments, it would be evident to an artisan with ordinary skill in the art that said embodiments can be modified, reduced, or enhanced without departing from the scope and spirit of the claims described below.

What is claimed is:

1. One or more non-transitory computer-readable media comprising a set of computer-executable instructions that when executed by one or more programmed electronic processors, cause the processors to:
   receive a request to upload a file to a cloud platform;
   associate the received request with a corresponding transaction in a journal of a hybrid cloud cache;
   determine if a parent folder of the file is in a metadata file system of a subsystem of the hybrid cloud cache used to recover files;
   if the parent folder of the file is in the metadata file system of the subsystem, then move the file to a data cache file system of the subsystem;
   if the parent folder of the file is not in the metadata file system of the subsystem, then attempt to push the file to the cloud platform;
   determine if a failure occurred while attempting to push the file to the cloud platform, and
   if the failure occurred and the file does not push to the cloud platform, then move the file to the data cache file system of the subsystem.

2. The one or more non-transitory computer-readable media of claim 1, wherein the instructions further comprise instructions that when executed cause the processor or processors to:
   add an entry for the file in a meta-file of the parent folder; and
   mark the transaction corresponding to the received request as completed in the journal of the hybrid cloud cache.

3. The one or more non-transitory computer-readable media of claim 1, wherein the instructions further comprise instructions that when executed cause the processor or processors to release the transaction corresponding to the request.

4. The one or more non-transitory computer-readable media of claim 1, wherein the instructions further comprise instructions that when executed cause the processor or processors to log information about the file moved to the subsystem to protect against a crash and to persist the information in the event of a reboot.

5. The one or more non-transitory computer-readable media of claim 1, wherein the instructions further comprise instructions that when executed cause the processor or processors to provide an internal meta-namespace to the subsystem that is not visible to a client device or process.

6. One or more non-transitory computer-readable media comprising a set of computer-executable instructions that when executed by one or more programmed electronic processors, cause the processors to:
   receive a request to create a new folder in a cloud platform;
   associate the received request with a corresponding transaction in a journal of a hybrid cloud cache;
   determine if a parent folder of the new folder is in a metadata file system of a subsystem of the hybrid cloud cache used to recover files;
   if the parent folder of the new folder is in the metadata file system of the subsystem, then flag the new folder as being in the subsystem;
   if the parent folder of the new folder is not in the metadata file system of the subsystem, then attempt to create the new folder in the cloud platform;
   determine if a failure occurred while attempting to create the new folder in the cloud platform; and
   if the failure occurred and the new folder is not created in the cloud platform, then move the new folder to the metadata file system of the subsystem.

7. The one or more non-transitory computer-readable media of claim 6, wherein the instructions further comprise instructions that when executed cause the processor or processors to flag the new folder as being in the subsystem and rename the new folder.

8. The one or more non-transitory computer-readable media of claim 6, wherein the instructions further comprise instructions that when executed cause the processor or processors to:
   add an entry for the new folder in a meta-file of the parent folder; and
   mark the transaction corresponding to the received request as completed in the journal of the hybrid cloud cache.

9. The one or more non-transitory computer-readable media of claim 8, wherein the instructions further comprise instructions that when executed cause the processor or processors to release the transaction corresponding to the request.

10. The one or more non-transitory computer-readable media of claim 7, wherein the instructions further comprise instructions that when executed cause the processor or processors to add an entry in a meta-file of the subsystem corresponding to the rename of the new folder.

11. The one or more non-transitory computer-readable media of claim 6, wherein the instructions further comprise instructions that when executed cause the processor or processors to log information about the folder moved to the subsystem to protect against a crash and to persist the information in the event of a reboot.

12. The one or more non-transitory computer-readable media of claim 6, wherein the instructions further comprise instructions that when executed cause the processor or processors to provide an internal meta-namespace to the subsystem that is not visible to a client device or process.

13. One or more non-transitory computer-readable media comprising a set of computer-executable instructions that when executed by one or more programmed electronic processors, cause the processors to:
   receive a request to upload a file to a cloud platform or a request to create a new folder in the cloud platform;
   associate the received request with a corresponding transaction in a journal of a hybrid cloud cache;
   if the request is to upload the file, then determine if a parent folder of the file is in a metadata file system of a subsystem of the hybrid cloud cache used to recover files;

if the parent folder of the file is in the metadata file system of the subsystem, then move the file to a data cache file system of the subsystem;

if the parent folder of the file is not in the metadata file system of the subsystem, then attempt to push the file to the cloud platform;

determine if a failure occurred while attempting to push the file to the cloud platform; and if the failure occurred and the file does not push to the cloud platform, then move the file to the data cache file system of the subsystem;

if the request is to create the new folder in the cloud platform, then determine if a parent folder of the new folder is in a metadata file system of a subsystem of the hybrid cloud cache used to recover files;

if the parent folder of the new folder is in the metadata file system of the subsystem, then flag the new folder as being in the subsystem;

if the parent folder of the new folder is not in the metadata file system of the subsystem, then attempt to create the new folder in the cloud platform;

determine if a failure occurred while attempting to create the new folder in the cloud platform; and if the failure occurred and the new folder is not created in the cloud platform, then move the new folder to the metadata file system of the subsystem.

14. The one or more non-transitory computer-readable media of claim 13, wherein the instructions further comprise instructions that when executed cause the processor or processors to flag the new folder as being in the subsystem and rename the new folder.

15. The one or more non-transitory computer-readable media of claim 13, wherein the instructions further comprise instructions that when executed cause the processor or processors to:

add an entry for the file or the new folder in a meta-file of the parent folder; and mark the transaction corresponding to the received request as completed in the journal of the hybrid cloud cache.

16. The one or more non-transitory computer-readable media of claim 14, wherein the instructions further comprise instructions that when executed cause the processor or processors to add an entry in a meta-file of the subsystem corresponding to the rename of the new folder.

17. The one or more non-transitory computer-readable media of claim 13, wherein the instructions further comprise instructions that when executed cause the processor or processors to add an entry in the meta-file of the parent folder that indicates that the new folder is already in the subsystem if the parent folder is already in the metadata file system of the subsystem.

18. The one or more non-transitory computer-readable media of claim 13, wherein the instructions further comprise instructions that when executed cause the processor or processors to log information about the file or the new folder moved to the subsystem to protect against a crash and to persist the information in the event of a reboot.

19. The one or more non-transitory computer-readable media of claim 13, wherein the instructions further comprise instructions that when executed cause the processor or processors to provide an internal meta-namespace to the subsystem that is not visible to a client device or process.

20. The one or more non-transitory computer-readable media of claim 15, wherein the instructions further comprise instructions that when executed cause the processor or processors to release the transaction corresponding to the request.

* * * * *